United States Patent
Hapsari et al.

(10) Patent No.: US 8,498,236 B2
(45) Date of Patent: Jul. 30, 2013

(54) MOBILE COMMUNICATION SYSTEM

(75) Inventors: Wuri Andarmawanti Hapsari, Yokosuka (JP); Hideaki Takahashi, Yokohama (JP); Anil Umesh, Yokohama (JP); Mikio Iwamura, Tokyo (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/266,359

(22) PCT Filed: Apr. 21, 2010

(86) PCT No.: PCT/JP2010/057084
§ 371 (c)(1),
(2), (4) Date: Oct. 26, 2011

(87) PCT Pub. No.: WO2010/125955
PCT Pub. Date: Nov. 4, 2010

(65) Prior Publication Data
US 2012/0069789 A1   Mar. 22, 2012

(30) Foreign Application Priority Data
Apr. 27, 2009   (JP) .................... 2009-108556

(51) Int. Cl.
*H04B 7/14*   (2006.01)
(52) U.S. Cl.
USPC .......................................................... 370/315
(58) Field of Classification Search
None
See application file for complete search history.

(56) References Cited

U.S. PATENT DOCUMENTS

| | | | |
|---|---|---|---|
| 2008/0090575 A1 | 4/2008 | Barak et al. | |
| 2008/0285501 A1 | 11/2008 | Zhang et al. | |
| 2009/0003831 A1* | 1/2009 | Zheng | 398/115 |
| 2010/0195635 A1 | 8/2010 | Maeda | |
| 2010/0215015 A1* | 8/2010 | Miao et al. | 370/329 |
| 2010/0265915 A1* | 10/2010 | Sun et al. | 370/331 |

(Continued)

FOREIGN PATENT DOCUMENTS

| | | |
|---|---|---|
| JP | 2007-116696 A | 5/2007 |
| JP | 2008-236269 A | 10/2008 |
| WO | 2009/022610 A1 | 2/2009 |

OTHER PUBLICATIONS

Japanese Office Action for corresponding Japanese Application No. 2009-108556, mailed Oct. 4, 2011, and English translation thereof (6 pages).

(Continued)

*Primary Examiner* — Raj Jain
(74) *Attorney, Agent, or Firm* — Osha Liang LLP

(57) ABSTRACT

A radio base station according to the present invention comprising: a mobile communication system, a relay node and a first radio base station are connected via a radio bearer, the first radio base station and a second radio base station are connected, a mobile station is configured to perform a handover process between a state in which a radio bearer is set with the relay node so as to communicate via the relay node and the first radio base station, and a state in which a radio bearer is set with the second radio base station so as to communicate via the second radio base station, and the handover process is configured such that a radio bearer is set between the relay node and the second radio base station, and the control signals involved in the handover process are sent and received via the radio bearer that has been set between the relay node and the second radio base station.

1 Claim, 10 Drawing Sheets

U.S. PATENT DOCUMENTS

| | | | | |
|---|---|---|---|---|
| 2011/0149905 | A1* | 6/2011 | Kim | 370/331 |
| 2012/0044836 | A1* | 2/2012 | Sivavakeesar et al. | 370/255 |
| 2012/0093070 | A1* | 4/2012 | Huang et al. | 370/315 |
| 2012/0120831 | A1* | 5/2012 | Gonsa et al. | 370/252 |
| 2012/0287790 | A1* | 11/2012 | Huang et al. | 370/236 |

OTHER PUBLICATIONS

3GPP TSG-RAN WG2 #65bis R2-092153, Qualcomm Europe, Preference for Relay Operation in LTE-A, Mar. 23, 2009 (6 pages).

3GPP TSG RAN WG1 #55bis R1-090290, Texas Instruments, On the Design of Relay Node for LTE-Advanced, Jan. 12, 2009 (10 pages).

3GPP TS 36.300 V8.8.0, 3rd Generation Partnership Project; Technical Specification Group Radio Access Network; Evolved Universal Terrestrial Radio Access (E-UTRA) and Evolved Universal Terrestrial Radio Access (E-UTRAN); Mar. 2009 (157 pages).

Office Action mailed Oct. 4, 2011 in corresponding Japanese Application No. 2009-108556, with translation, 5 pages.

International Search Report issued in PCT/JP2010/057084, mailed on Jun. 29, 2010, with translation, 7 pages.

Written Opinion issued in PCT/JP2010/057084, mailed on Jun. 29, 2010, 6 pages.

Extended European Search Report for EP 10 76 9654, mailed Feb. 28, 2013 (8 pages).

3GPP TS 36.423 V10.3.0, "3rd Generation Partnership Project; Technical Specification Group Radio Access Network; Evolved Universal Terrestrial Radio Access Network (E-UTRAN); X2 application protocol (X2AP) (Release 10)," Jun. 2011 (132 pages).

* cited by examiner

MOBILE COMMUNICATION SYSTEM

TECHNICAL FIELD

The present invention relates to a mobile communication system.

BACKGROUND ART

A mobile communication system of the LTE scheme (Release.8) defined by the 3GPP, as illustrated in FIG. 12, is configured such that when a handover process of a mobile station UE is carried out from a radio base station eNB#1 to a radio base station eNB#2, control signals involved in the handover process are sent and received between the radio base station eNB#1 and the radio base station eNB#2 via an X2 bearer that has been set between the radio base station eNB#1 and the radio base station eNB#2.

As illustrated in FIG. 12, the radio base station eNB#1 and the radio base station eNB#2 include a network layer 1 (NW L1) function, a network layer 2 (NW L2) function, an IP (Internet Protocol) layer function, and an SCTP (Stream Control Transmission Protocol) layer function as the X2 bearer functions configured to establish the X2 bearer.

In an LTE-Advanced mobile communication system, which is the communication scheme that is the next-generation of the LTE scheme, "relay nodes RN" including the same functions as a radio base station eNB can establish a connection between a mobile station UE and the radio base station eNB.

However, the conventional mobile communication system has been problematic in that there is no regulation for how handover processes of the mobile station UE are to be performed when the relay nodes RN have been connected.

Therefore, the present invention is intended to overcome the above-described problem. An object of the present invention is to provide a mobile communication system capable of also implementing handover processes by a mobile station even when relay nodes have been connected.

SUMMARY OF THE INVENTION

The first feature of the present invention is summarized in that a mobile communication system, a relay node and a first radio base station are connected via a radio bearer, the first radio base station and a second radio base station are connected, a mobile station is configured to perform a handover process between a state in which a radio bearer is set with the relay node so as to communicate via the relay node and the first radio base station, and a state in which a radio bearer is set with the second radio base station so as to communicate via the second radio base station, and the handover process is configured such that a radio bearer is set between the relay node and the second radio base station, and the control signals involved in the handover process are sent and received via the radio bearer that has been set between the relay node and the second radio base station.

The first feature of the present invention is summarized in that the relay node and the second radio base station include a layer function configured to perform keep-alive processes for the radio bearer, as an upper layer function of the function configured to set the radio bearer.

The first feature of the present invention is summarized in that the relay node and the second radio base station comprise a first layer function configured to perform security processes between the relay node and the second radio base station, as an upper layer function of the function configured to set the radio bearer and a second layer function configured to perform keep-alive processes for the radio bearer as an upper layer function of the first layer function.

The second feature of the present invention is summarized in that a mobile communication system, a relay node and a first radio base station are connected via a radio bearer, the first radio base station and the second radio base station are connected via a bearer, a mobile station is configured to perform a handover processes between a first state in which a radio bearer is set with the relay node so as to communicate via the relay node and the first radio base station, and a second state in which a radio bearer is set with the second radio base station so as to communicate via the second radio base station, and the handover process is configured such that control signals involved in the handover process are sent and received via a radio bearer between the relay node and the second radio base station, and via a bearer between the second radio base station and the first radio base station.

The second feature of the present invention is summarized in that the relay node, upon receiving a measurement report from the mobile station, is configured to transfer the measurement report to the first radio base station via the radio bearer between the relay node and the first radio base station, and the first radio base station, upon deciding to initiate the handover process of the mobile station from the first state to the second state based on the measurement report, is configured to send a handover request signal giving notification of this intention to the second radio base station via the bearer between the first radio base station and the second radio base station as a control signal involved in the handover process.

The second feature of the present invention is summarized in that the relay node, upon deciding to initiate the handover process of the mobile station from the first state to the second state, is configured to send a handover request signal giving notification of this intention to the first radio base station via the radio bearer between the relay node and the first radio base station as a control signal involved in the handover process, and the first radio base station is configured to transfer the received handover request signal to the second radio base station via the bearer between the first radio base station and the second radio base station.

As has been described above, according to the present invention, it is possible to provide a mobile communication system capable of also implementing handover processes by a mobile station even when relay nodes have been connected.

DETAILED DESCRIPTION (Mobile Communication System According to a Third Embodiment of the Present Invention)

A description will be provided for the mobile communication system according to a first embodiment of the present invention, with reference to FIG. 1 to FIG. 5.

Figure 1:
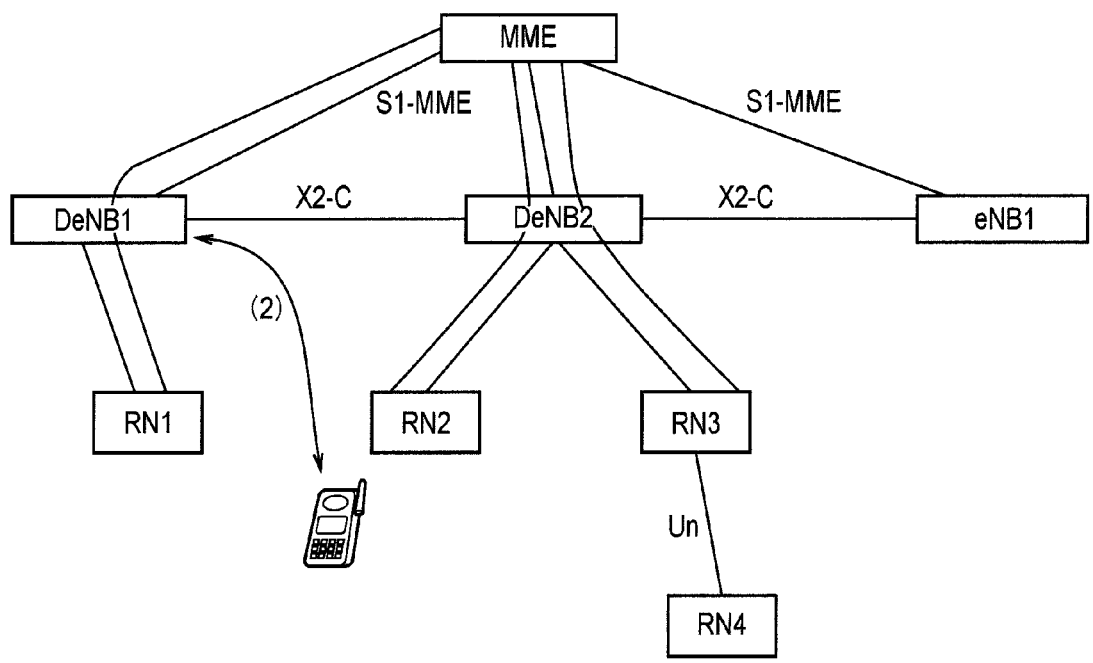
FIG. 1 is a diagram showing the entire configuration of the mobile communication system according to a first embodiment of the present invention.

The mobile communication system according to the present invention is an LTE-Advanced mobile communication system including, for example as illustrated in FIG. 1, a mobile switching center MME, relay nodes RN1 to RN4, a radio base station DeNB1 (Donor eNB) that is connected to the relay node RN1, a radio base station DeNB2 that is connected to the relay nodes RN2 and RN3, and a radio base station eNB1.

Herein, the radio base station DeNB1 and the radio base station DeNB2 are connected via an X2-C interface, and the radio base station DeNB2 and the radio base station eNB1 are connected via an X2-C interface.

Also, the radio base station DeNB1, the radio base station DeNB2 and the radio base station eNB1 are respectively connected with the mobile switching center MME via S1-MME interfaces.

In such a mobile communication system, the mobile station UE is configured to set a radio bearer between the radio base stations eNB (DeNB) and the relay nodes RN in order to perform radio communication.

In addition, the mobile communication system, as illustrated in (2) of FIG. 1, is configured such that the mobile station UE conducts a handover process between the state in which a radio bearer is set with the relay node RN2 in order to communicate via the relay node RN2 and the radio base station DeNB2 (the first radio base station), and the state in which a radio bearer is set with the radio base station DeNB1 (the second radio base station) in order to communicate via the radio base station DeNB1.

Further, such a handover process is configured such that an X2-C radio bearer (radio bearer) is set between the relay node RN2 and the radio base station DeNB1, and control signals involved in the handover process (X2AP signals) are sent and received via the X2-C radio bearer that has been set.

Figure 2:
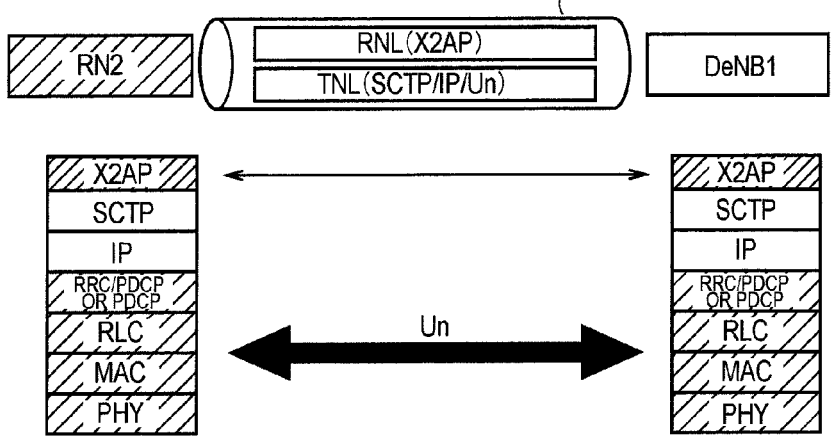
FIG. 2 is a diagram showing the protocol stack of the mobile communication system according to the first embodiment of the present invention.
Figure 3:
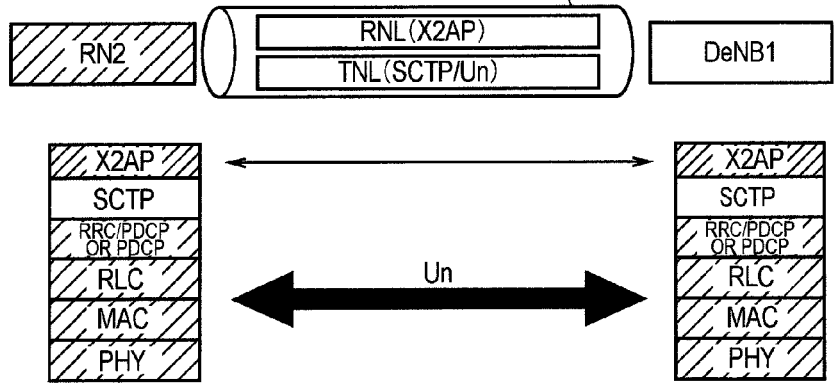
FIG. 3 is a diagram showing the protocol stack of the mobile communication system according to the first embodiment of the present invention.
Figure 4:
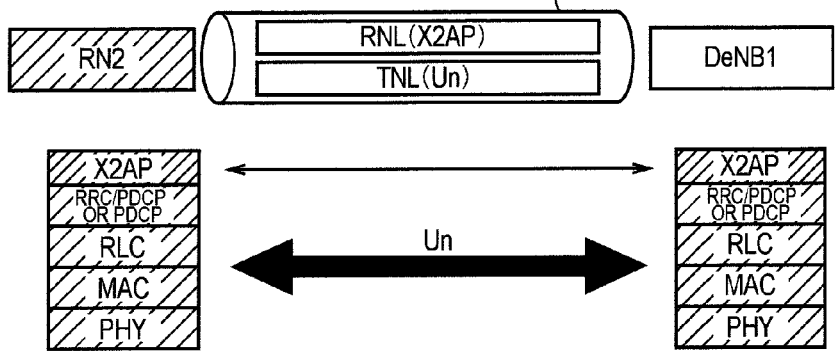
FIG. 4 is a diagram showing the protocol stack of the mobile communication system according to the first embodiment of the present invention.

For example, as illustrated in FIG. 2 to FIG. 4, the relay node RN2 and the radio base station DeNB1 include a physical (PHY) layer function as an X2-C radio bearer function configured to set the X2-C radio bearer, an MAC (Media Access Control) layer function provided as an upper layer function of the physical (PHY) layer function, an RLC (Radio Link Control) layer function provided as an upper layer function of the MAC layer function, and a PDCP (Packet Data Convergence Protocol) layer function provided as an upper layer function of the RLC layer function.

Note that the relay node RN2 and the radio base station DeNB1 may include an RRC (Radio Resource Control) layer function provided as an upper layer function of the PDCP layer function.

In addition, as illustrated in FIG. 2, the relay node RN2 and the radio base station DeNB1 may include an IP layer function (first layer function) configured to perform security processes between the relay node RN2 and the radio base station DeNB2 as an upper layer function of the X2-C radio bearer function, and may include an SCTP layer function (second layer function) configured to perform keep-alive processes for the X2-C radio bearer as an upper layer function of the IP layer function.

Alternatively, as illustrated in FIG. 3, the relay node RN2 and the radio base station DeNB1 may include an SCTP layer function configured to perform keep-alive processes for the X2-C radio bearer, as an upper layer function of the X2-C radio bearer function. In the example in FIG. 3, the relay node RN2 and the radio base station DeNB1 do not include an IP layer function configured to perform security processes between the relay node RN2 and the radio base station DeNB2.

Furthermore, as illustrated in FIG. 4, the relay node RN2 and the radio base station DeNB1 may not include an SCTP layer function configured to perform keep-alive processes for the X2-C radio bearer as an upper layer function of the X2-C radio bearer, nor with an IP layer function configured to perform security processes between the relay node RN2 and the radio base station DeNB1.

A description is given below with reference to FIG. 5 for the operation in the mobile communication system according to this embodiment in which the mobile station UE hands over from the state in which a radio bearer is set with the relay node RN2 in order to communicate via the relay node RN2 and the radio base station DeNB2, to the state in which a radio bearer is set with the radio base station DeNB1 in order to communicate via the radio base station DeNB1.

Figure 5:
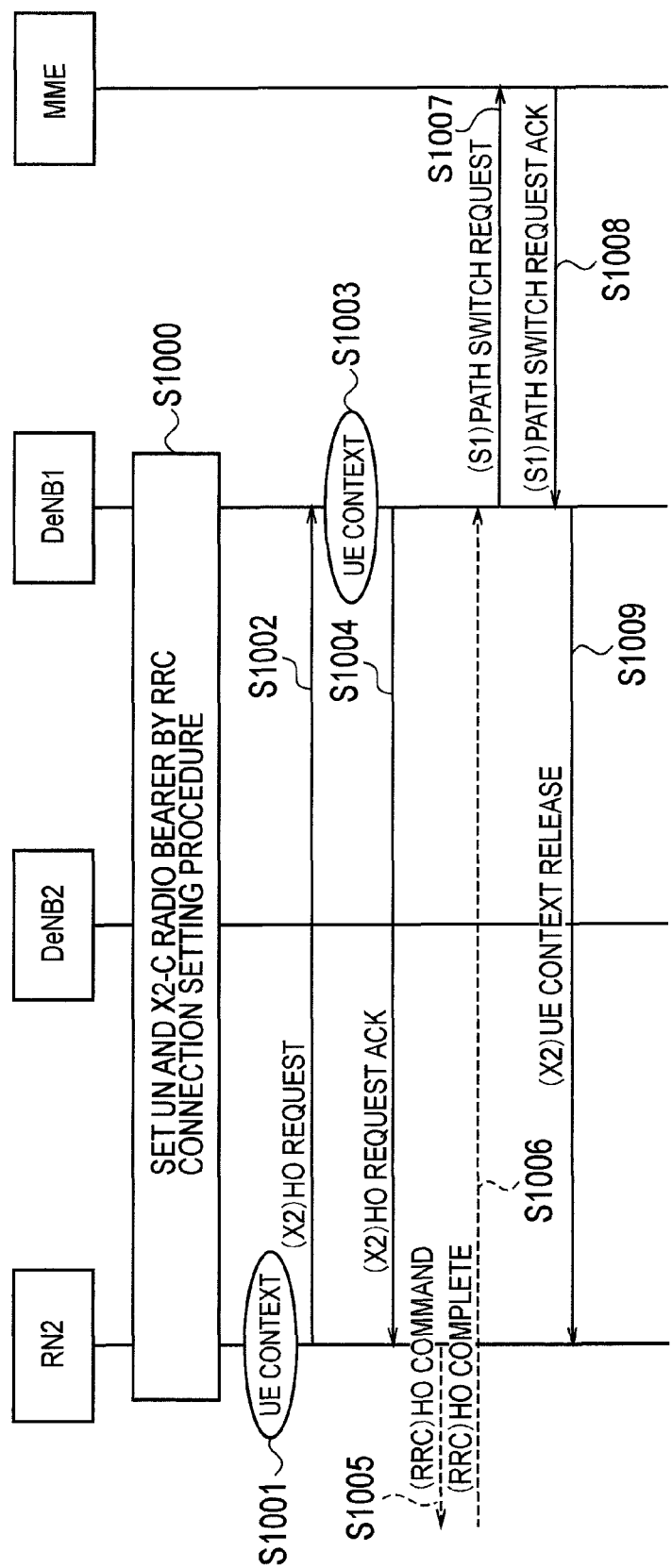
FIG. 5 is a sequence diagram illustrating the operation of the mobile communication system according to the first embodiment of the present invention.

As illustrated in FIG. 5, in step S1000, the relay node RN2, upon deciding to perform a handover process of the mobile station UE from the relay node RN2 to the radio base station DeNB1, sets the X2-C radio bearer with the radio base station DeNb1 by the RRC connection setting procedure.

The relay node RN2 manages the "UE Context" of the mobile station UE in step S1001, and then in step S1002 sends an "HO Request (handover request signal)" to the radio base station DeNB1 via the X2-C radio bearer, requesting a handover of the mobile station UE from the relay node RN2 to the radio base station DeNB1.

The radio base station DeNB1, upon receiving the "HO Request" stores the "UE Context" of the mobile station UE in step S1003, and then in step S1004 sends an "HO Request Ack (handover request acknowledgement signal)" to the relay node RN2 via the X2-C radio bearer.

In step S1005, the relay node RN2 sends an "HO Command (handover instruction signal)" to the mobile station UE by means of the RRC layer function, instructing a handover to the radio base station DeNB1.

In step S1006, the mobile station UE sends an "HO Complete (handover completion signal)" to the radio base station DeNB1 by means of the RRC layer function.

In step S1007, the radio base station DeNB1 sends a "Path Switch Request (path switch request signal)" to the mobile switching center MME via the S1-MME interface.

In step S1008, the mobile switching center MME sends a "Path Switch Request Ack (path switch request acknowledgement signal)" to the radio base station DeNB1 via the S1-MME interface, and also switches the transfer address of signals addressed to the mobile station UE from the relay node RN2 to the radio base station DeNB1.

In step S1009, the radio base station DeNB1 sends a "UE Context Release" to the relay node RN2 via the X2-C radio bearer, and the relay node RN2 terminates management of the "UE Context" of the mobile station UE in reaction to the "UE Context Release".

Note that in FIG. 5, the relay node RN2 and the radio base station DeNB1 may be interchanged.

According to the mobile communication system of this embodiment, it is possible to implement a handover process involving the relay nodes RN without performing a major renovation of the protocol stack of each device used in the LTE mobile communication system.

(Mobile Communication System According to a Third Embodiment of the Present Invention)

Figure 6:
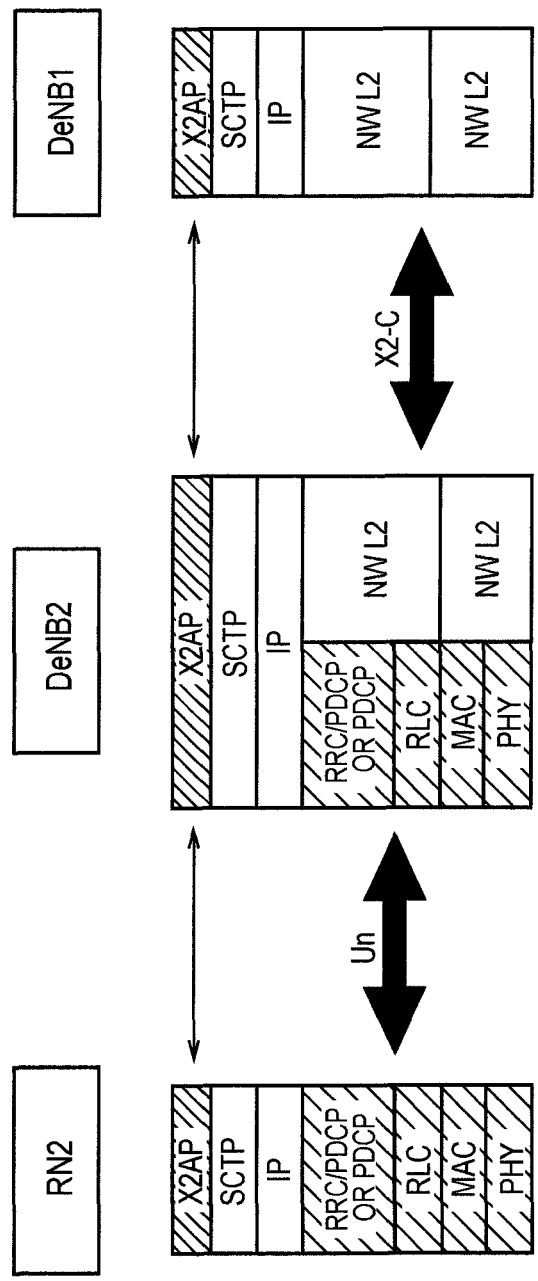
FIG. 6 is a diagram showing the protocol stack of the mobile communication system according to a second embodiment of the present invention.
Figure 7:
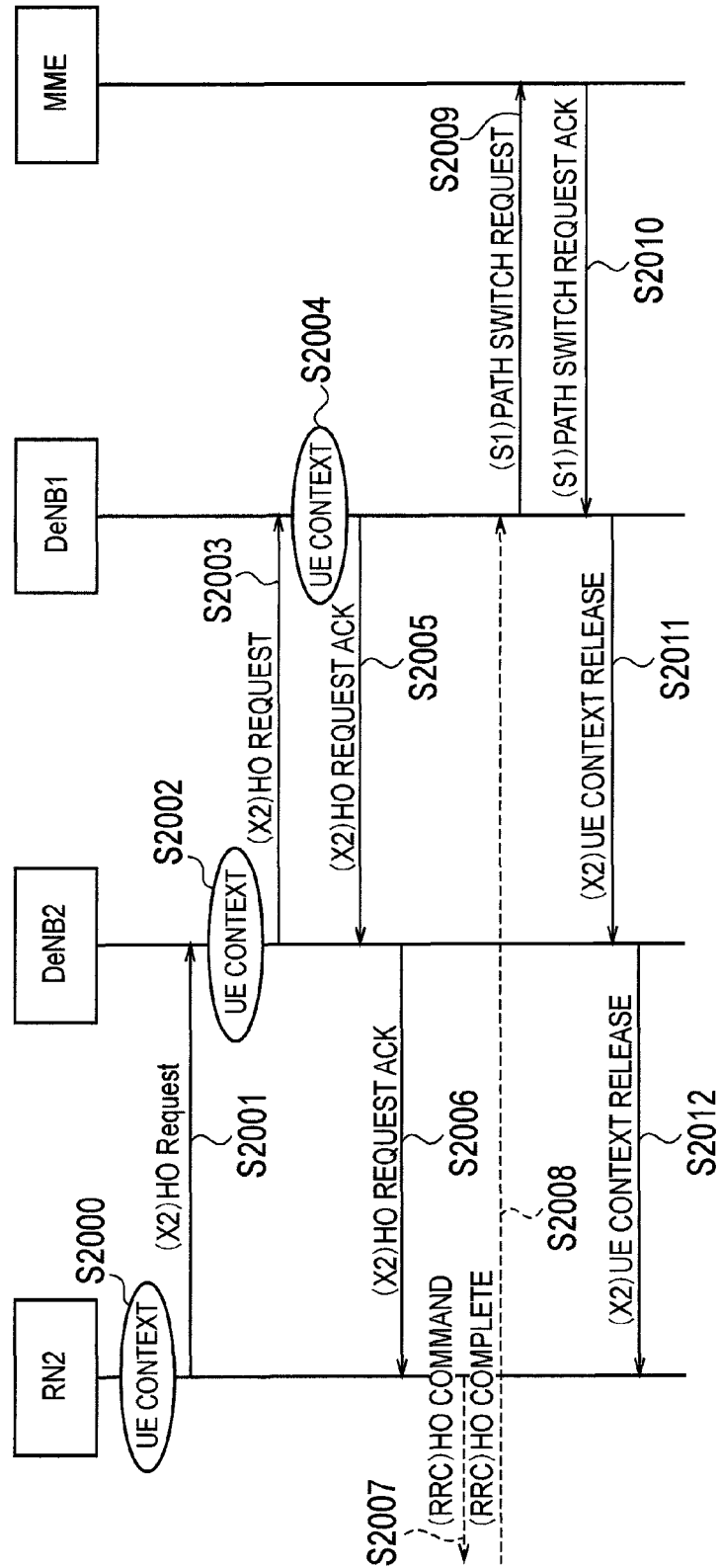
FIG. 7 is a sequence diagram illustrating the operation of the mobile communication system according to the second embodiment of the present invention.

A description will be provided for the mobile communication system according to the second embodiment of the present invention, with reference to FIG. 6 and FIG. 7. The mobile communication system according to the second embodiment of the present invention will be described below by focusing on the points of difference from the mobile communication system according to the first embodiment described above.

The mobile communication system according to this embodiment is configured such that, during the handover process described above, control signals involved in the handover process are sent and received via an X2-C radio bearer (Un interface) between the relay node RN2 and the radio base station DeNB2, and via a bearer (X2-C interface) between the radio base station DeNB2 and the radio base station DeNB1.

Specifically, as illustrated in FIG. 6, the relay node RN2 includes a physical (PHY) layer function as an X2-C radio bearer function configured to establish an X2-C radio bearer (Un interface) with the radio base station DeNB2, an MAC layer function provided as an upper layer function of the physical (PHY) layer function, an RLC layer function provided as an upper layer function of the MAC layer function, and a PDCP layer function provided as an upper layer function of the RLC layer function.

Note that the relay node RN2 may include an RRC layer function provided as an upper layer function of the PDCP layer function.

Further, as illustrated in FIG. 6, the relay node RN2 may include an IP layer function configured to perform security processes between the relay node RN2 and the radio base station DeNB2 as an upper layer function of the X2-C radio bearer functions, and may include an SCTP layer function configured to perform keep-alive processes for the X2-C radio bearer as an upper layer function of the IP layer function.

The relay node RN2 may include an X2AP layer function configured to send and receive control signals involved in the handover process, as an upper layer function of the SCTP layer function.

The radio base station DeNB2 further includes an X2-C radio bearer function configured to establish an X2-C radio bearer (Un interface) with the relay node RN2, and a bearer function of establishing a bearer (X2-C interface) with the radio base station DeNB1.

Herein, the radio base station DeNB2 includes a network layer 1 (NW L1) function and a network layer 2 (NW L2) function as bearer functions.

The radio base station DeNB2 also includes an IP layer function provided as an upper layer function of the X2-C radio bearer function and the bearer function, an SCTP layer function provided as an upper layer function of the IP layer function, and an X2AP layer function provided as an upper layer function of the SCTP layer function.

Furthermore, the radio base station DeNB1 include a network layer 1 (NW L1) function and a network layer 2 (NW L2) function as bearer functions configured to set the bearer with the radio base station DeNB2.

The radio base station DeNB1 also includes an IP layer function provided as an upper layer function of the bearer functions, an SCTP layer function provided as an upper layer function of the IP layer function, and an X2AP layer function provided as an upper layer function of the SCTP layer function.

A description is given below with reference to FIG. 7 for the operation in the mobile communication system according to this embodiment in which the mobile station UE hands over from the state in which a radio bearer is set with the relay node RN2 in order to communicate via the relay node RN2 and the radio base station DeNB2, to the state in which a radio bearer is set with the radio base station DeNB1 in order to communicate via the radio base station DeNB1.

As illustrated in FIG. 7, the relay node RN2 manages the "UE Context" of the mobile station UE in step S2000, and in step S2001 sends an "HO Request (handover request signal)" to the radio base station DeNB2 via the X2-C radio bearer, requesting a handover of the mobile station UE from the relay node RN2 to the radio base station DeNB1.

The radio base station DeNB2, upon receiving the "HO Request" by means of the X2AP layer function, stores the "UE Context" of the mobile station UE in step S2002, and in step S2003 transfers the "HO Request" to the radio base station DeNB1 via the X2-C radio bearer.

The radio base station DeNB1, upon receiving the "HO Request," stores the "UE Context" of the mobile station UE in step S2004, and then in step S2005 sends an "HO Request Ack (handover request acknowledgement signal)" to the radio base station DeNB2 via the X2-C radio bearer.

The radio base station DeNB2, upon receiving the "HO Request Ack" by means of the X2AP layer function, transfers the "HO Request Ack" to the relay node RN2 via the X2-C radio bearer in step S2006.

In step S2007, the relay node RN2 sends an "HO Command (handover instruction signal)" to the mobile station UE by means of the RRC layer function, instructing a handover to the radio base station DeNB1.

In step S2008, the mobile station UE sends an "HO Complete (handover completion signal)" to the radio base station DeNB1 by means of the RRC layer function.

In step S2009, the radio base station DeNB1 sends a "Path Switch Request (path switch request signal)" to the mobile switching center MME via the S1-MME interface.

In step S2010, the mobile switching center MME sends a "Path Switch Request Ack (path switch request acknowledgement signal)" to the radio base station DeNB1 via the S1-MME interface, and also switches the transfer address of signals addressed to the mobile station UE from the relay node RN2 to the radio base station DeNB1.

In step S2011, the radio base station DeNB1 sends a "UE Context Release" to the radio base station DeNB2 via the X2-C radio bearer, and in step S2012 the radio base station DeNB2 transfers the "UE Context Release" to the relay node RN2 via the X2-C radio bearer by means of the X2AP layer function such that the relay node RN2 terminates management of the "UE Context" of the mobile station UE in reaction to the "UE Context Release".

Note that in FIG. 7, the relay node RN2 and the radio base station DeNB1 may be interchanged.

As described above, the X2AP layer function in the radio base station DeNB2 is configured to convert the control signal (X2AP signal) involved in the handover process between the relay node RN2 and the radio base station DeNB2, and the control signal (X2AP signal) involved in the handover process between the radio base station DeNB1 and the radio base station DeNB2.

The X2AP layer function in the radio base station DeNB2 is also configured to manage the mobile station ID that is used between the relay node RN2 and the radio base station DeNB2 in association with the mobile station ID that is used between the radio base station DeNB1 and the radio base station DeNB2.

(Mobile Communication System According to a Third Embodiment of the Present Invention)

Figure 8:
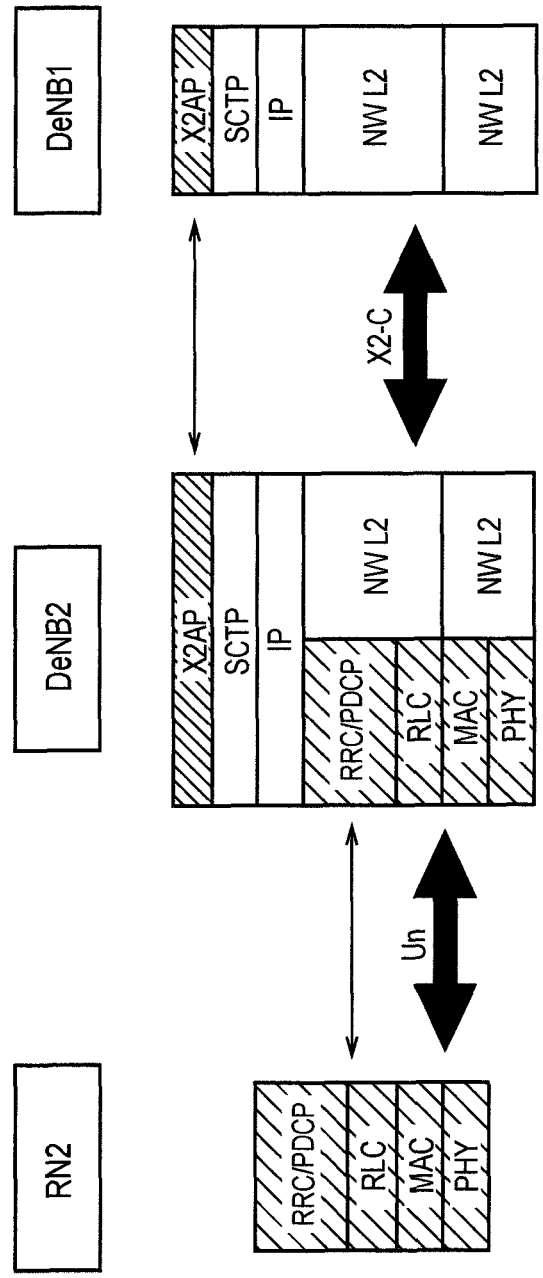
FIG. 8 is a diagram showing the protocol stack of the mobile communication system according to a third embodiment of the present invention.
Figure 9:
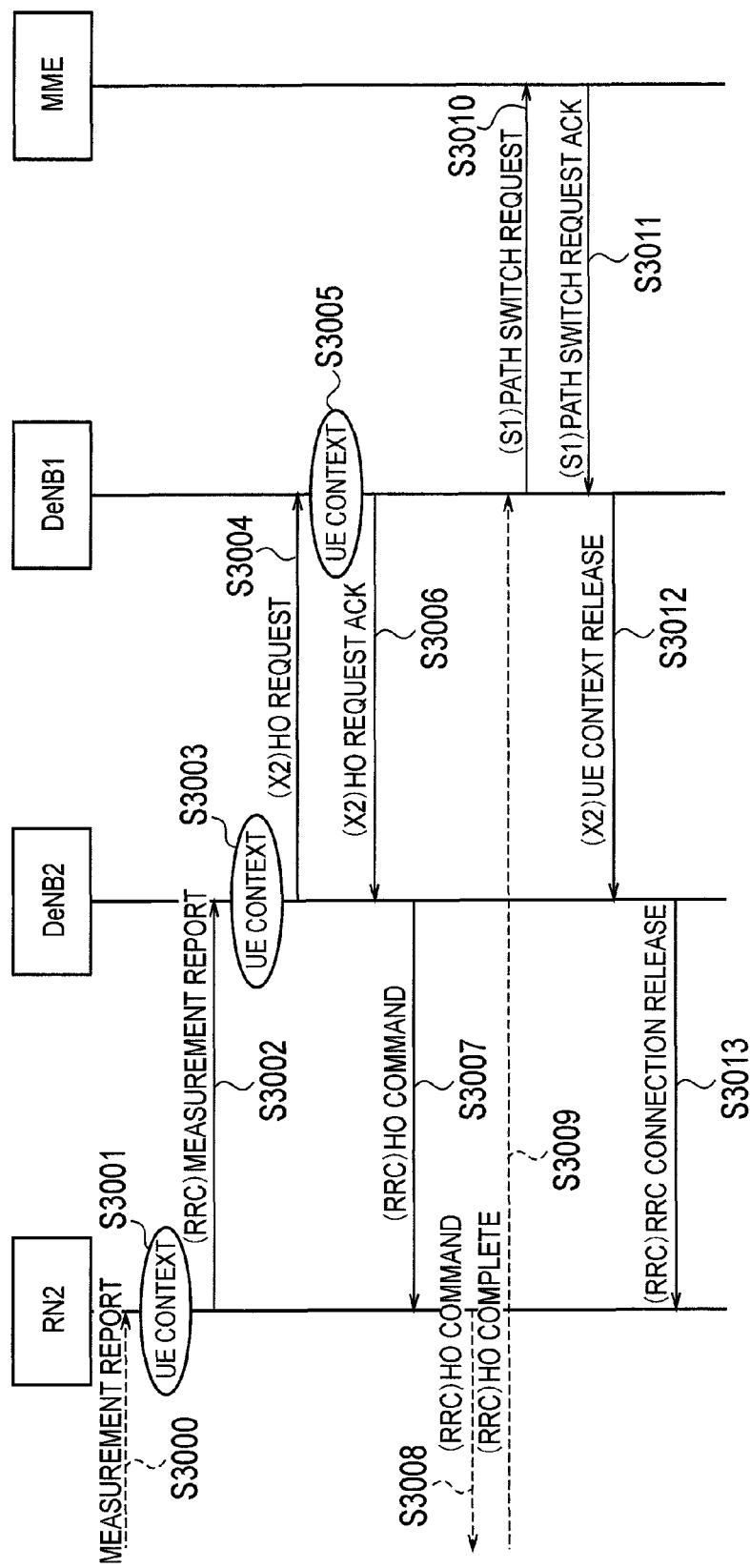
FIG. 9 is a sequence diagram showing the operation of the mobile communication system according to the third embodiment of the present invention.

A description will be provided for the mobile communication system according to a third embodiment of the present invention, with reference to FIG. 8 and FIG. 9. The mobile communication system according to the third embodiment of the present invention will be described below by focusing on the points of difference from the mobile communication system according to the first embodiment described above.

The mobile communication system according to this embodiment is configured such that, during the handover process described above, control signals involved in the handover process are sent and received via an X2-C radio bearer (Un interface) between the relay node RN2 and the radio base station DeNB2, and via a bearer (X2-C interface) between the radio base station DeNB2 and the radio base station DeNB1.

Specifically, as illustrated in FIG. 8, the relay node RN2 includes a physical (PHY) layer function as an X2-C radio bearer function configured to establish an X2-C radio bearer (Un interface) with the radio base station DeNB2, an MAC layer function provided as an upper layer function of the physical (PHY) layer function, an RLC layer function provided as an upper layer function of the MAC layer function, and a PDCP layer function provided as an upper layer function of the RLC layer function.

Note that the relay node RN2 may include an RRC layer function provided as an upper layer function of the PDCP layer function.

As illustrated in FIG. 8, relay node RN2 is configured to operate as a proxy of the RRC layer function in the mobile station UE, and may not include an IP layer function configured to perform security processes between the relay node RN2 and the radio base station DeNB2 as an upper layer function of the X2-C radio bearer function, an SCTP layer function configured to perform keep-alive processes for the X2-C radio bearer, and an X2AP layer function configured to send and receive control signals involved in the handover process.

The radio base station DeNB2 further includes an X2-C radio bearer function configured to establish an X2-C radio bearer (Un interface) with the relay node RN2, and a bearer function configured to establish a bearer (X2-C interface) with the radio base station DeNB1.

Herein, the radio base station DeNB2 includes a network layer 1 (NW L1) function and a network layer 2 (NW L2) function as bearer functions.

The radio base station DeNB2 also includes an IP layer function provided as an upper layer function of the X2-C radio bearer function and the bearer function, an SCTP layer function provided as an upper layer function of the IP layer function, and an X2AP layer function provided as an upper layer function of the SCTP layer function.

Moreover, the radio base station DeNB1 includes a network layer 1 (NW L1) function and a network layer 2 (NW L2) function as bearer functions of setting the bearer (X2-C interface) with the radio base station DeNB2.

The radio base station DeNB1 also includes an IP layer function provided as an upper layer function of the bearer functions, an SCTP layer function provided as an upper layer function of the IP layer function, and an X2AP layer function provided as an upper layer function of the SCTP layer function.

A description is given below with reference to FIG. 9 for the operation in the mobile communication system according to this embodiment in which the mobile station UE hands over from the state in which a radio bearer is set with the relay node RN2 in order to communicate via the relay node RN2 and the radio base station DeNB2, to the state in which a radio bearer is set with the radio base station DeNB1 in order to communicate via the radio base station DeNB1.

As illustrated in FIG. 9, the relay node RN2, upon receiving a "Measurement Report (measurement report)" from the mobile station UE in step S3000, acquires the "UE Context" of the mobile station UE under management in step S3001, and then transfers the "Measurement Report" including the "UE Context" of the mobile station UE to the radio base station DeNB2 by means of the RRC layer function in step 3002.

The radio base station DeNB2 decides to conduct a handover process of the mobile station UE from the relay node RN2 to the radio base station DeNB2 based on the received "Measurement Report", stores the "UE Context" of the mobile station UE in step S3003, and then sends an "HO Request (handover request signal)" to the radio base station DeNB1 via the X2-C radio bearer in step S3004, requesting a handover of the mobile station UE from the relay node RN2 to the radio base station DeNB1.

The radio base station DeNB1, upon receiving the "HO Request," stores the "UE Context" of the mobile station UE in step S3005, and then in step S3006 sends an "HO Request Ack (handover request acknowledgement signal)" to the radio base station DeNB2 via the X2-C radio bearer.

The radio base station DeNB2, upon receiving the "HO Request Ack," sends an "HO Command (handover instruction signal)" to the relay node RN2 by means of the RRC layer function in step S3007, instructing a handover to the radio base station DeNB1.

In step S3008, the relay node RN2 transfers the received "HO Command" to the mobile station UE by means of the RRC layer function.

In step S3009, the mobile station UE sends an "HO Complete (handover completion signal)" to the radio base station DeNB1 by means of the RRC layer function.

In step S3010, the radio base station DeNB1 sends a "Path Switch Request (path switch request signal)" to the mobile switching center MME via the S1-MME interface.

In step S3011, the mobile switching center MME sends a "Path Switch Request Ack (path switch request acknowledgement signal)" to the radio base station DeNB1 via the S1-MME interface, and also switches the transfer address of signals addressed to the mobile station UE from the relay node RN2 to the radio base station DeNB1.

In step S3012, the radio base station DeNB1 sends a "UE Context Release" to the radio base station DeNB2 via the X2-C radio bearer such that, in step S3013, the radio base station DeNB2 transfers an "RRC Connection Release" to the relay node RN2 by means of the RRC layer function, and the relay node RN2 terminates management of the "UE Context" of the mobile station UE in reaction to the "RRC Connection Release".

(Mobile Communication System According to a Fourth Embodiment of the Present Invention)

Figure 10:
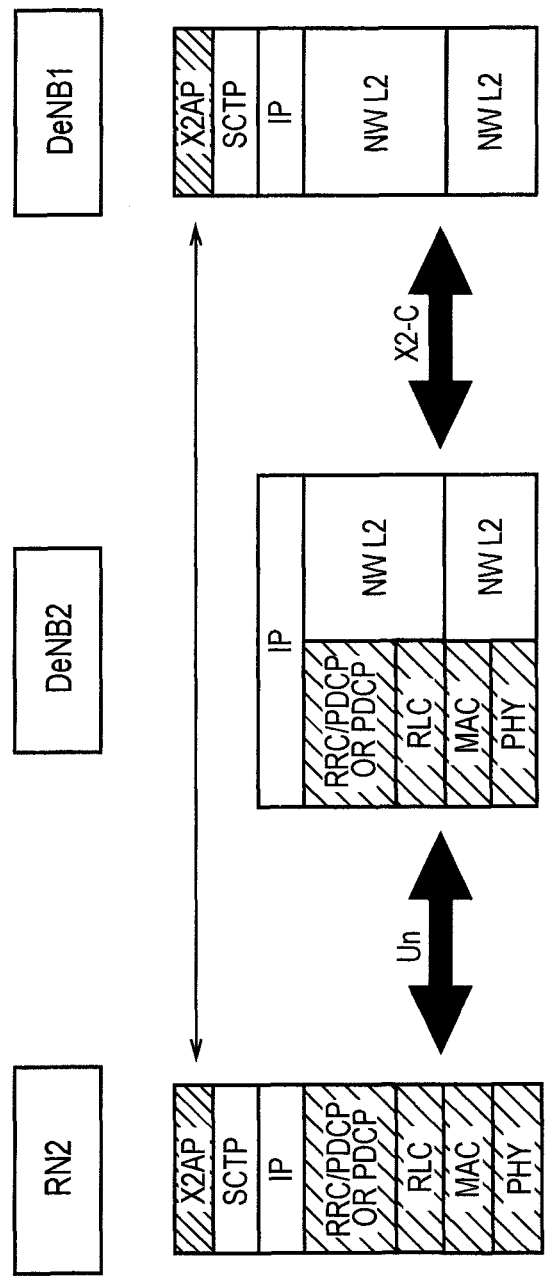
FIG. 10 is a diagram showing the protocol stack of the mobile communication system according to a fourth embodiment of the present invention.
Figure 11:
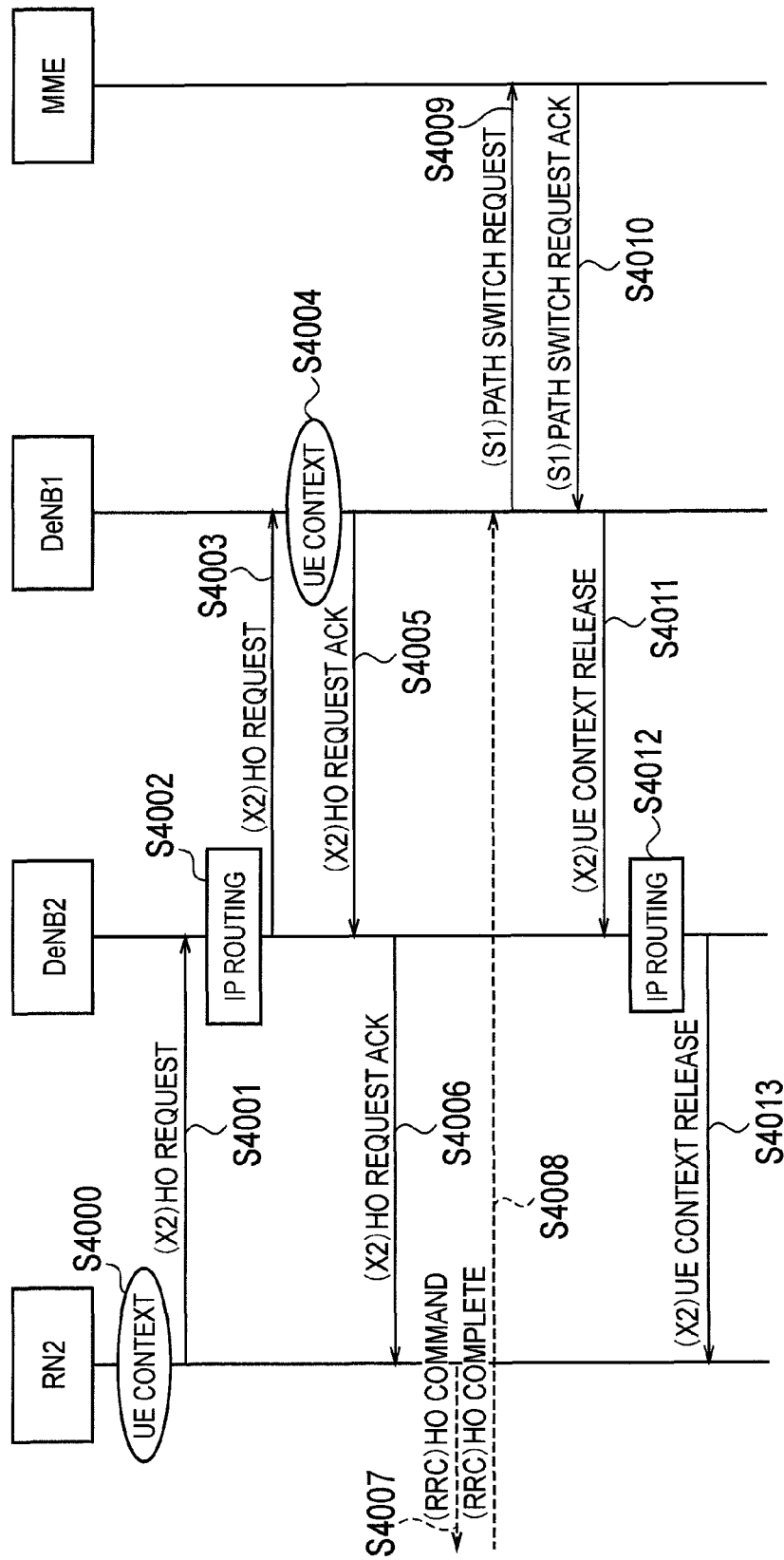
FIG. 11 is a sequence diagram showing the operation of the mobile communication system according to the fourth embodiment of the present invention.
Figure 12:
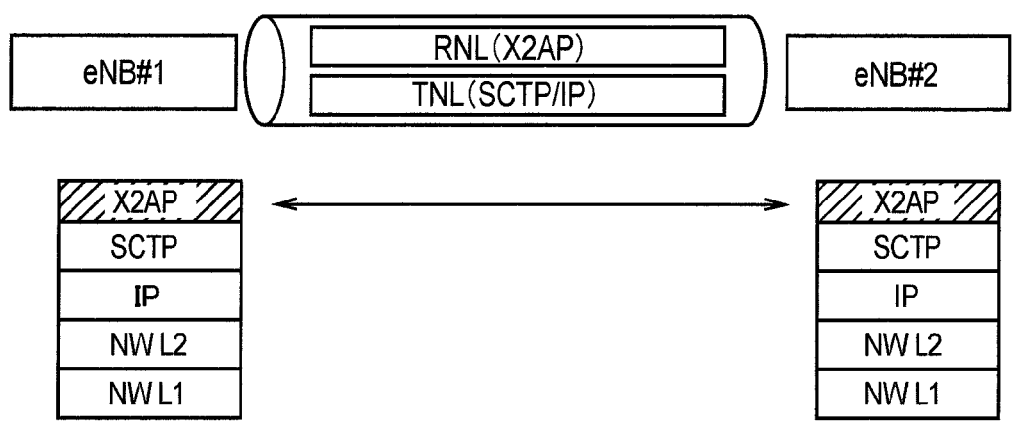
FIG. 12 is a diagram showing the protocol stack of a current mobile communication system.

A description is provided for the mobile communication system according to a fourth embodiment of the present invention, with reference to FIG. 10 and FIG. 11. The mobile communication system according to the fourth embodiment of the present invention will be described below by focusing on the points of difference from the mobile communication system according to the first embodiment described above.

The mobile communication system according to this embodiment is configured such that, during the handover process described above, control signals involved in the handover process are sent and received via an X2-C radio bearer (Un interface) between the relay node RN2 and the radio base station DeNB2, and via a bearer (X2-C interface) between the radio base station DeNB2 and the radio base station DeNB1.

Specifically, as illustrated in FIG. 10, the relay node RN2 includes a physical (PHY) layer function as an X2-C radio bearer function configured to set an X2-C radio bearer (Un interface) with the radio base station DeNB2, an MAC layer function provided as an upper layer function of the physical (PHY) layer function, an RLC layer function provided as an upper layer function of the MAC layer function, and a PDCP layer function provided as an upper layer function of the RLC layer function.

Note that the relay node RN2 may include an RRC layer function provided as an upper layer function of the PDCP layer function.

Further, as illustrated in FIG. 10, the relay node RN2 may include an IP layer function configured to perform security processes between the relay node RN2 and the radio base station DeNB2 as an upper layer function of the X2-C radio bearer functions, and may include an SCTP layer function configured to perform keep-alive processes for the X2-C radio bearer as an upper layer function of the IP layer function.

The relay node RN2 may include an X2AP layer function configured to send and receive control signals involved in the handover process, as an upper layer function of the SCTP layer function.

The radio base station DeNB2 further includes an X2-C radio bearer function configured to establish an X2-C radio bearer (Un interface) with the relay node RN2, and a bearer function of establishing a bearer (X2-C interface) with the radio base station DeNB1.

Herein, the radio base station DeNB2 includes a network layer 1 (NW L1) function and a network layer 2 (NW L2) function as bearer functions.

The radio base station DeNB2 also includes an IP layer function as an upper layer function of the X2-C radio bearer function and the bearer function, but does not include an SCTP layer function nor an X2AP layer function as an upper layer function of the IP layer.

Furthermore, the radio base station DeNB1 includes a network layer 1 (NW L1) function and a network layer 2 (NW L2) function as bearer functions of setting the bearer with the radio base station DeNB2.

The radio base station DeNB1 also includes an IP layer function provided as an upper layer function of the bearer functions, an SCTP layer function provided as an upper layer function of the IP layer function, and an X2AP layer function provided as an upper layer function of the SCTP layer function.

A description is given below with reference to FIG. 11 for the operation in the mobile communication system according to this embodiment in which the mobile station UE hands over from the state in which a radio bearer is set with the relay node RN2 in order to communicate via the relay node RN2 and the radio base station DeNB2, to the state in which a radio bearer is set with the radio base station DeNB1 in order to communicate via the radio base station DeNB1.

As illustrated in FIG. 11, the relay node RN2 manages the "UE Context" of the mobile station UE in step S4000, and sends in step S4001 an "HO Request (handover request signal)" to the radio base station DeNB2 via the X2-C radio bearer, requesting a handover of the mobile station UE from the relay node RN2 to the radio base station DeNB1.

The radio base station DeNB2, upon receiving the "HO Request" in step S4002 by means of the IP layer function, transfers the "HO Request" to the radio base station DeNB1 via the X2-C radio bearer in step S4003.

The radio base station DeNB1, upon receiving the "HO Request," stores the "UE Context" of the mobile station UE in step S4004, and then in step S4005 sends an "HO Request Ack (handover request acknowledgement signal)" to the radio base station DeNB2 via the X2-C radio bearer.

The radio base station DeNB2, upon receiving the "HO Request Ack" by means of the IP layer function, transfers the "HO Request Ack" to the relay node RN2 via the X2-C radio bearer in step S4006.

In step S4007, the relay node RN2 sends an "HO Command (handover instruction signal)" to the mobile station UE by means of the RRC layer function, instructing a handover to the radio base station DeNB1.

In step S4008, the mobile station UE sends an "HO Complete (handover completion signal)" to the radio base station DeNB1 by means of the RRC layer function.

In step S4009, the radio base station DeNB1 sends a "Path Switch Request (path switch request signal)" to the mobile switching center MME via the S1-MME interface.

In step S4010, the mobile switching center MME sends a "Path Switch Request Ack (path switch request acknowledgement signal)" to the radio base station DeNB1 via the S1-MME interface, and also switches the transfer address of signals addressed to the mobile station UE from the relay node RN2 to the radio base station DeNB1.

In step S4011, the radio base station DeNB1 sends a "UE Context Release" to the radio base station DeNB2 via the X2-C radio bearer, such that the radio base station DeNB2, upon receiving the "UE Context Release" by means of the I layer function in step S4012, transfers the "UE Context Release" to the relay node RN2 via the X2-C radio bearer in step S4013, and the relay node RN2 terminates management of the "UE Context" of the mobile station UE in reaction to the "UE Context Release".

Note that operation of the above described the mobile station UE, the relay node RN, the radio base station eNB and the mobile switching center MME may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, the relay node RN, the radio base station eNB and the mobile switching center MME. Also, the storage medium and the processor may be provided in the mobile station UE, the relay node RN, the radio base station eNB and the mobile switching center MME as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication system in which a relay node and a first radio base station are connected via a radio bearer and the first radio base station and a second radio base station are connected, wherein:

the relay node comprises:
- as a radio bearer function of setting a Un interface between the relay node and the first radio base station, a physical layer function;
- an MAC layer function provided as an upper layer function of the physical layer function;
- an RLC layer function provided as an upper layer function of the MAC layer function;
- a PDCP layer function provided as an upper layer function of the RLC layer function;
- an RRC layer function provided as an upper layer function of the PDCP layer function,
- an IP layer function as an upper layer function of the radio bearer function;
- an SCTP layer function provided as an upper layer function of the IP layer function; and
- an X2AP layer function provided as an upper layer function of the SCTP layer function, the first radio base station comprises:
- as a radio bearer function of setting a Un interface between the first radio base station and the relay node, a physical layer function;
- an MAC layer function provided as an upper layer function of the physical layer function;
- an RLC layer function provided as an upper layer function of the MAC layer function;
- a PDCP layer function provided as an upper layer function of the RLC layer function;
- an RRC layer function provided as an upper layer function of the PDCP layer function,
- an IP layer function as an upper layer function of the radio bearer function;
- an SCTP layer function provided as an upper layer function of the IP layer function; and
- an X2AP layer function provided as an upper layer function of the SCTP layer function, the second radio base station comprises an X2AP layer function, and a control signal relating to a handover process is configured to terminate between the X2AP layer function of the relay node and the X2AP layer function of the first radio base station and between the X2AP layer function of the first radio base station and the X2AP layer function of the second radio base station; and the SCTP layer function of the relay node and the SCTP layer function of the first radio base station are configured to perform keep-alive processes for the radio bearer.

* * * * *